Oct. 22, 1940.   H. C. DRAKE   2,218,673

RAIL FLAW DETECTOR MECHANISM

Filed Aug. 5, 1937

INVENTOR.
HARCOURT C. DRAKE
BY
Joseph H. Lipschutz
ATTORNEY

Patented Oct. 22, 1940

2,218,673

UNITED STATES PATENT OFFICE 2,218,673

RAIL FLAW DETECTOR MECHANISM

Harcourt C. Drake, Hempstead, N. Y., assignor to Sperry Products, Inc., Brooklyn, N. Y., a corporation of New York Application August 5, 1937, Serial No. 157,460

4 Claims. (Cl. 175—183)

This invention relates to rail flaw detector mechanisms and is particularly adapted for use on the Sperry rail flaw detector car wherein current generated within the car is passed through a rail to establish an electromagnetic field surrounding the same and detector mechanism is employed for investigating the said field as the car moves along the rails to determine irregularities in said field caused by the presence of internal defects within the rail. A difficulty which has been experienced in the use of such devices has been due to the fact that surface defects, such as burns which occur at frequent intervals due to the slipping of car wheels, cause distortion of the magnetic field surrounding the rail in the same manner as an internal defect. The detector mechanism, in the case of the surface defect, was therefore affected in the same manner as when an internal defect was present in the rail, to generate an E. M. F., which after being suitably amplified by a thermionic amplifier was caused to operate a pen on a chart within the car and at the same time was caused to operate a spray gun to spray paint on the rail in the region of the defect. An operator at the rear of the car, having the moving chart before him and seeing the paint marks on the rail which coincided with the marks on the chart, would, in case he saw the paint mark opposite a surface defect, assume that the mark was caused by the surface defect. It sometimes happens, however, that large fissures were located directly beneath the surface defect and were thus missed by reason of the fact that the operator seeing the surface defect could not tell that a fissure was present at the same point.

Heretofore, there were employed detector mechanisms in the form of induction coils having cores extending therethrough with legs projecting downwardly toward the rail surface. These detector mechanisms were as sensitive to surface defects as to internal defects within the rail, and therefore no distinction was possible. Recently, however, various means have been devised for rendering the detector mechanism more sensitive to internal defects than to surface defects, and I employ this development as the basis for the present invention to provide a method and means whereby the presence of large fissures under surface defects may be detected.

Further objects and advantages of this invention will become apparent in the following detailed description.

In the accompanying drawing.

Figure 1:
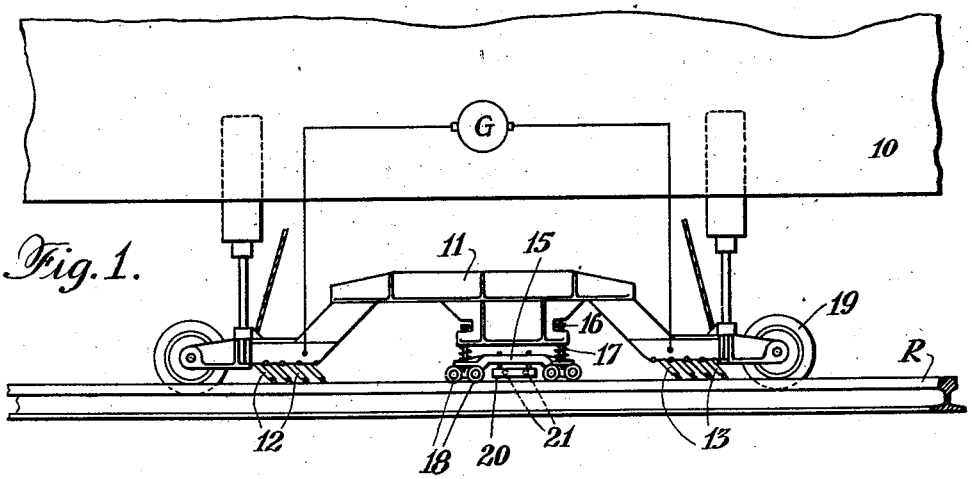
Fig. 1 is a side view of a portion of a Sperry rail flaw detector car having my invention applied thereto.
Figure 2:
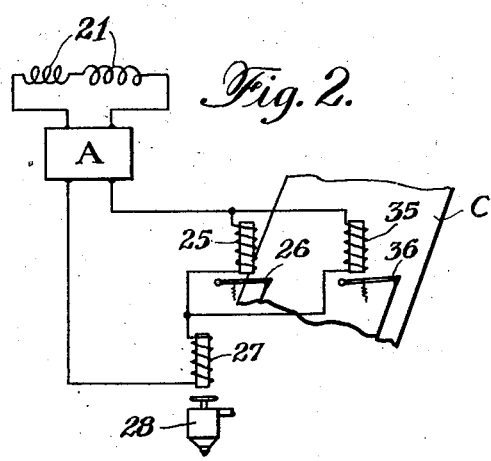
Fig. 2 is a wiring diagram illustrating the operation of the detector and indicating means.

Referring to Fig. 1 of the drawing, there is disclosed a detector mechanism applied to a Sperry detector car. A portion of the car body 10 is shown having suspended therefrom a current brush carriage 11 whose front and rear sets of brushes 12 and 13 are designed to lead current into and out of the rail R, the said current being supplied from a generator G within the car. The current brush carriage is supported on the rail by wheels 19 and supports in turn the detector carriage 15. Said carriage may ride along the rail on any suitable means such as rollers 18 and may be connected to the current brush carriage by means such as loosely fitting bolts 16 and springs 17 whereby the detector carriage may move relative to the current brush carriage in order to align itself with the irregularities in the rail surface. The detector carriage supports within a housing 20 flux responsive means such as pairs of induction coils 21 arranged in tandem and oppositely connected so as not to be affected by variations in current supply. The current through the rail between brushes 12 and 13 sets up a magnetic field surrounding the rail, which is uniform except in the region of flaw. The coils normally cut a constant number of lines of force, but on entering a region of flaw, first one and then the other of the coils will cut a different number of lines of force to generate a differential E. M. F.

The differential E. M. F. generated by the coils 21 may be suitably amplified by a thermionic amplifier A, the output of which may be caused to actuate pen relay 25 to actuate a pen 26 on a moving chart C. At the same time, the output of amplifier A may be caused to energize a relay 27 to actuate a paint gun 28 to spray paint upon the rail in the region of flaw. An operator sitting at the rear of the car, noticing a mark made on the chart C, looks for the paint mark on the rail as it emerges from under the car and if no surface defect is visible at that point he assumes that there is an internal defect present and the car is stopped so that the marked portion of the rail may be investigated.

As stated in the introduction, surface defects distort the magnetic field in the same manner as internal defects and will cause actuation of pen 26 and paint gun 28. The operator at the rear of the car can see the surface defect and if the paint mark is positioned at such point he assumes that the mark is due to a surface defect. He therefore does not stop the car for investigation of that portion of the rail. In practice, however, it has been found that such portions of the rail having surface defects thereon, have sometimes had a large internal fissure directly beneath the surface defect. Obviously, the operator in such case assumed that the indication on the chart and the mark on the rail were due to the surface defect alone since there was no way by which he could inform himself of the presence of the internal defect at the same point in addition to the surface defect.

Heretofore, the character of the flux responsive mechanism was such that it responded in much the same manner and to substantially the same degree to surface defects and to internal defects. Therefore, any attempt to segregate these two types of defect was impossible. In the patent to C. B. Roede, Reissue No. 20,343, dated April 27, 1937, there is disclosed a method by which the effect of surface defects may be radically reduced. This method consists in increasing the reluctance of the magnetic path through the induction coil which is utilized as the flux responsive means. To the extent that the reluctance of the magnetic path through the induction coil is increased, the effect of surface defects is decreased. This phenomenon reaches its maximum point when an air core is employed for the induction coil.

Figure 3:
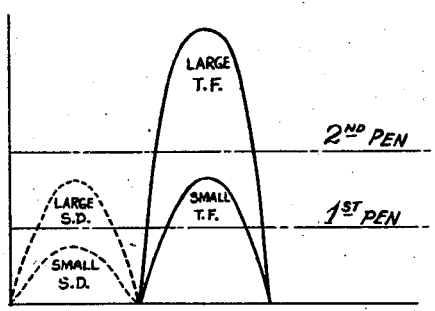
Fig. 3 is a diagram illustrating the theory underlying this invention.

I make use of the above fact to provide a method and means for determining the presence of large fissures positioned directly beneath surface defects. The theory of this invention is disclosed in Fig. 3 which illustrates graphically the responses to surface defects and transverse fissures of all flux responsive means having magnetic paths of relatively high reluctance therethrough.

It will be seen that the responses to surface defects increase with the size of the surface defects and the responses to transverse fissures increase with increasing size of said fissures, but that the rate of increase of response is much greater in the case of fissures than in the case of surface defects. The larger surface defect yields a response which, while it is of substantially the same magnitude as certain small transverse fissures, is appreciably smaller than the response of the detector mechanism to large transverse fissures. If now, in addition to output relay 25, I place a second output relay 35 in parallel therewith, but the relay 35 being of such characteristics that it requires a substantially larger output of amplifier A to actuate the same, then it will be seen that I have a method for detecting the presence of large fissures under surface defects. If both relays 25 and 35 are energized sufficiently to actuate their pens 26 and 36, then two notches will appear in the normally straight lines which these pens draw upon chart C. The operator looking out of the car at the rear thereof and noticing a paint mark on a portion of rail which has a surface defect, will, in case only one mark appears on the chart, assume that there is no large transverse fissure beneath the surface defect. If, however, in connection with the paint mark on the rail he notices a surface defect opposite said paint mark and at the same time observes that both pens 26 and 36 have been actuated to make two marks on the chart, then he knows that a large transverse fissure is present in addition to the surface defect.

Figure 4:
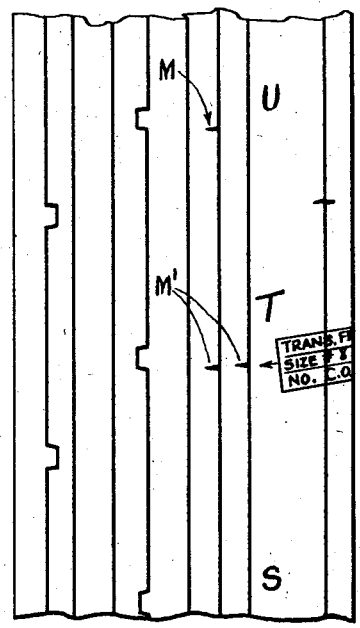
Fig. 4 is a reproduction of a portion of an actual record tape showing the operation of this invention.

Actual operation of this device is shown in Fig. 4 which is a reproduction of a portion of an actual record chart made in testing operation. It will be seen that mark M being but a single mark made by pen 26 was caused by a surface defect. At a point in the rail corresponding to the marks M' the operator noted a surface defect, but the fact that both pens had made indications on the chart caused him to have this portion of the rail investigated and there was found directly beneath the surface defect a very large transverse fissure.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting internal defects in a rail in the region of a surface defect, which comprises causing flaws to generate larger impulses than surface defects, causing said impulses to act upon an indicator, and providing said indicator with sufficient resistance so that it is operated only by impulses in excess of the largest impulse caused by a surface defect.

2. The method of detecting internal defects in a rail in the region of a surface defect, which comprises causing flaws to generate larger impulses than surface defects, causing said impulses to act upon a plurality of indicators, and providing at least one of said indicators with sufficient resistance so that it is operated only by impulses in excess of the largest impulse caused by a surface defect.

3. In a rail flaw detector mechanism, in combination, a detector which is more responsive to internal flaws than to surface defects, said detector being adapted to generate impulses in the region of defects, an indicator, means whereby said impulses act upon said indicator, said indicator being adapted to be operated only by impulses in excess of the largest impulse caused by a surface defect.

4. In a rail flaw detector mechanism, in combination, a detector which is more responsive to internal flaws than to surface defects, said detector being adapted to generate impulses in the region of defects, a plurality of indicators, means whereby said impulses act upon said indicators, one of said indicators being adapted to be operated only by impulses in excess of the largest impulse caused by a surface defect.

HARCOURT C. DRAKE.